United States Patent
Watanabe et al.

(10) Patent No.: US 11,007,428 B2
(45) Date of Patent: May 18, 2021

(54) INFORMATION PROCESSING SYSTEM, INFORMATION PROCESSING METHOD, AND NON-TRANSITORY COMPUTER-READABLE STORAGE MEDIUM

(71) Applicant: NINTENDO CO., LTD., Kyoto (JP)

(72) Inventors: Ken Watanabe, Kyoto (JP); Shunichi Shirai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 652 days.

(21) Appl. No.: 14/702,955

(22) Filed: May 4, 2015

(65) Prior Publication Data

US 2015/0335996 A1    Nov. 26, 2015

(30) Foreign Application Priority Data

May 21, 2014 (JP) .............................. JP2014-105531

(51) Int. Cl.
*A63F 13/213* (2014.01)
*A63F 13/211* (2014.01)
*G06T 19/00* (2011.01)
*A63F 13/537* (2014.01)
*A63F 13/5255* (2014.01)

(52) U.S. Cl.
CPC .......... *A63F 13/213* (2014.09); *A63F 13/211* (2014.09); *A63F 13/5255* (2014.09); *A63F 13/537* (2014.09); *G06T 19/00* (2013.01)

(58) Field of Classification Search
CPC .. A63F 13/211; A63F 13/213; A63F 13/5255; A63F 13/537; G06T 19/00
USPC .......................................................... 463/34
See application file for complete search history.

(56) References Cited

U.S. PATENT DOCUMENTS

| 6,361,438 | B1 * | 3/2002 | Morihira | ................ | A63F 13/10 |
| | | | | | 463/31 |
| 8,002,634 | B2 * | 8/2011 | Komatsumoto | ........ | A63F 13/00 |
| | | | | | 463/32 |

(Continued)

FOREIGN PATENT DOCUMENTS

| JP | 2001-293245 | 10/2001 |
| JP | 2002-279445 | 9/2002 |

(Continued)

OTHER PUBLICATIONS

Office Action dated Apr. 17, 2018 issued in JP Application No. 2014-105531 (3 pgs.) and Translation (3 pgs.).

(Continued)

*Primary Examiner* — Kang Hu
*Assistant Examiner* — Wei Lee
(74) *Attorney, Agent, or Firm* — Nixon & Vanderhye P.C.

(57) ABSTRACT

A video game apparatus for generating a captured image of a virtual camera set in a virtual space includes a virtual camera setting section configured to set an imaging direction of the virtual camera, a captured image generation section configured to change a transmittance of a transmittance variable object within the virtual space based on an imaging direction of the virtual camera, and generate a captured image of the virtual camera, and a display panel configured to display the captured image generated by the captured image generation section.

48 Claims, 4 Drawing Sheets

(56) References Cited

U.S. PATENT DOCUMENTS

2003/0020716 A1* 1/2003 Ouchi .................... G06T 15/10
 345/427
2009/0244064 A1* 10/2009 Inokuchi ................. A63F 13/10
 345/420
2013/0109470 A1 5/2013 Yamashita

FOREIGN PATENT DOCUMENTS

JP 2007-164651 6/2007
JP 2013-97473 5/2013

OTHER PUBLICATIONS

Office Action dated Jul. 10, 2018 issued in JP Application No. 2014-105531 (2 pgs.) and Translation (2 pgs.).

* cited by examiner

INFORMATION PROCESSING SYSTEM, INFORMATION PROCESSING METHOD, AND NON-TRANSITORY COMPUTER-READABLE STORAGE MEDIUM

CROSS REFERENCE TO RELATED APPLICATION

This application claims the benefit of Japanese Patent Application 2014-105531 filed in Japan Patent Office on May 21, 2014. The disclosure of this application is incorporated herein by reference.

FIELD

The technology herein relates to an information processing system for generating a captured image of a virtual camera set in a virtual space, an information processing method, and a non-transitory computer-readable storage medium.

BACKGROUND AND SUMMARY

There have been conventionally known information processing systems for playing a game or performing simulation in a virtual space. In such information processing systems, a virtual camera is set within a virtual space, and a captured image of the virtual camera is displayed on a display device.

In the conventional information processing systems, the following situation occurs. When a captured image is generated with an imaging direction of a virtual camera being changed, and the generated captured image is displayed, an object that a user desires to see is obstructed by a front object, and does not appear in the captured image.

The present disclosure provides an information processing system for performing display control of an object within a virtual space by generating a captured image of a virtual camera set in the virtual space.

An information processing system of an example embodiment is an information processing system for generating a captured image of a virtual camera set in a virtual space, and this information processing system has a configuration including a virtual camera setting section configured to set an imaging direction of the virtual camera, and an image generation section configured to change a transmittance of a predetermined object within the virtual space based on an imaging direction of the virtual camera, and generate a captured image of the virtual camera. With this configuration, a captured image in which an object located behind the predetermined object is also visible can be obtained. Here, changing a transmittance includes not making transparent (transmittance of 0%), and also includes deleting the predetermined object (transmittance of 100%).

The virtual camera setting section may set an imaging direction of the virtual camera based on an operation performed by a user to an input device. With this configuration, even if the user changes an imaging direction of the virtual camera, a captured image in which an object located behind the predetermined object is also visible from the virtual camera can be automatically obtained.

The virtual camera setting section may set an imaging direction of the virtual camera based on one or more detection values of an orientation detection sensor and/or a motion detection sensor that are included in the input device. With this configuration, the user can set an imaging direction by moving the input device.

The input device may further include a display device configured to display the captured image generated by the image generation section. With this configuration, the user can perform an operation while seeing a captured image in the input device.

The information processing system may be included in the input device, and the input device may further include a display device configured to display the captured image generated by the image generation section. With this configuration, the user can see a captured image via the input device.

The image generation section may change a transmittance of the predetermined object based on a relation between a predetermined direction in the virtual space and an imaging direction of the virtual camera. With this configuration, a transmittance of the predetermined object can be changed according to an imaging direction of the virtual camera with respect to the predetermined direction in the virtual space.

The image generation section may change the transmittance based on an angle between the predetermined direction in the virtual space and an imaging direction of the virtual camera. With this configuration, a transmittance can be changed according to an angle of an imaging direction of the virtual camera from a certain reference direction in the virtual space.

The image generation section may change the transmittance based on the angle when the angle is within a predetermined change range. With this configuration, a transmittance can be changed when an imaging direction of the virtual camera is within a change range.

The image generation section may set the transmittance at the maximum when the angle is smaller than a lower limit of the predetermined change range. The image generation section may instead set the transmittance at the minimum when the angle is smaller than a lower limit of the predetermined change range. With these configurations, a transmittance can be changed with a lower limit being set on a change range of an imaging direction of the virtual camera.

The image generation section may set the transmittance at the minimum when the angle is larger than an upper limit of the predetermined change range. The image generation section may instead set the transmittance at the maximum when the angle is larger than an upper limit of the predetermined change range. With these configurations, a transmittance can be changed with an upper limit being set on a change range of an imaging direction of the virtual camera.

The image generation section may linearly change the transmittance from the maximum to the minimum according to the angle, when the angle changes from a lower limit to an upper limit of the predetermined change range. In addition, the image generation section may linearly change the transmittance from the minimum to the maximum according to the angle, when the angle changes from an upper limit to a lower limit of the predetermined change range. With these configurations, a transmittance can be gradually changed when an imaging direction of the virtual camera changes within a change range.

The image generation section may set the transmittance to be higher as the angle is smaller. With this configuration, a transmittance of the predetermined object can be set to be higher when the virtual camera sees down to the virtual space. The image generation section may instead set the transmittance to be lower as the angle is smaller.

The predetermined direction may be a direction in which the virtual camera sees down to the virtual space. With this configuration, a transmittance can be changed based on an imaging direction of the virtual camera, with reference to a direction in which the virtual camera sees down to the virtual space.

The predetermined direction may be a gravity direction of the virtual space. With this configuration, a transmittance can be changed based on an imaging direction of the virtual camera, with reference to a gravity direction of the virtual space.

The predetermined direction may be a normal direction of a field of the virtual space. With this configuration, a transmittance can be changed based on an imaging direction of the virtual camera, with reference to a normal direction of a field of the virtual space.

The predetermined object may be one of the objects within the virtual space. With this configuration, a transmittance can be changed only for one of the objects within the virtual space.

The predetermined object may be a midair object within the virtual space. With this configuration, by changing a transmittance of a midair object, a captured image in which an object or the like that is located on a field behind the midair object is visible can be obtained.

The predetermined object may be an object having no influence on a game developed within the virtual space. With this configuration, changing a transmittance of an object can prevent a game from being affected even when the game is developed within the virtual space.

A plurality of the predetermined objects may be set in the virtual space, and a relation between an imaging direction of the virtual camera and the transmittance may be set for each of the predetermined objects. With this configuration, if there is a plurality of objects each having a variable transmittance in the virtual space, a transmittance of each object can be individually changed.

The image generation section may change the transmittance based on a position of the virtual camera within the virtual space. With this configuration, based on a position of the virtual camera, a manner of changing a transmittance based on an imaging direction of the virtual camera can be changed, or a change of a transmittance can be stopped.

The image generation section may change the transmittance based on a distance between the virtual camera and a player object within the virtual space. With this configuration, for example, if the virtual camera and a player object are located close to each other, control such as increasing a transmittance of the predetermined object can be performed.

A second aspect of the present technology is a device configured to display a captured image of a virtual camera set in a virtual space, and this device has a configuration including a sensor configured to detect orientation and/or motion, an image generation section configured to change a transmittance of a predetermined object within the virtual space based on one or more detection values of the sensor, and generate a captured image of the virtual camera, and a display device configured to display the captured image. With this configuration as well, a captured image in which an object located behind the predetermined object is also visible can be obtained.

A third aspect of the present technology is an information processing method for generating a captured image of a virtual camera set in a virtual space, and this information processing method has a configuration including a virtual camera setting step of setting an imaging direction of the virtual camera, and an image generation step of changing a transmittance of a predetermined object within the virtual space based on an imaging direction of the virtual camera, and generating a captured image of the virtual camera. With this configuration as well, a captured image in which an object located behind the predetermined object is also visible can be obtained.

A fourth aspect of the present technology is an information processing program for generating a captured image of a virtual camera set in a virtual space, and this information processing program has a configuration of causing a computer to execute a virtual camera setting step of setting an imaging direction of the virtual camera, and an image generation step of changing a transmittance of a predetermined object within the virtual space based on an imaging direction of the virtual camera, and generating a captured image of the virtual camera. With this configuration as well, a captured image in which an object located behind the predetermined object is also visible can be obtained.

DETAILED DESCRIPTION OF NON-LIMITING EXAMPLE EMBODIMENTS

An example embodiment of the technology will be described below with reference to the drawings. The example embodiment described below merely shows an example of a case where the technology is implemented, and is not to be construed as limiting the technology to the specific configuration described below. In implementing the technology, a specific configuration according to an example embodiment may be appropriately adopted. The following describes an example in which an information processing system is configured in a video game apparatus. The video game apparatus executes a video game developed in a three-dimensional virtual space.

Figure 1:
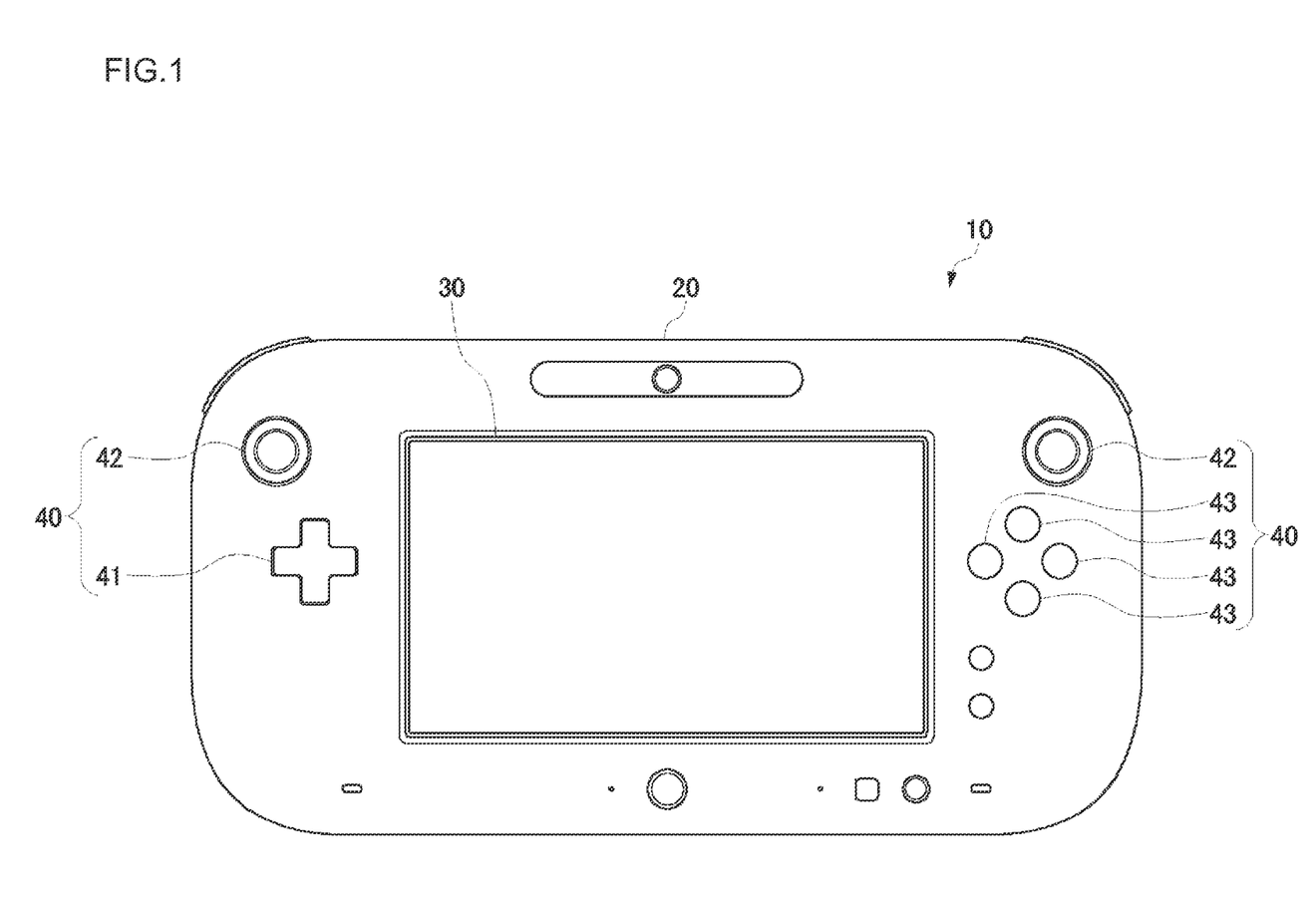
FIG. 1 shows an example non-limiting external view of a game apparatus including an information processing system.

FIG. 1 shows an example non-limiting external view of a video game apparatus including an information processing system. A video game apparatus 10 include a housing 20 having a flat plate shape. A touch panel 30 is provided at the center of the front surface of the housing 20. The touch panel 30 includes a resistance film type touch sensor on the surface of a liquid crystal display panel. A plurality of operation members 40 including a cross key 41, sticks 42, and buttons 43 is provided around the touch panel 30. The operation members 40 are also provided at the side surface and the back surface of the housing 20, but such operation members 40 are not shown in the figure.

Figure 2:
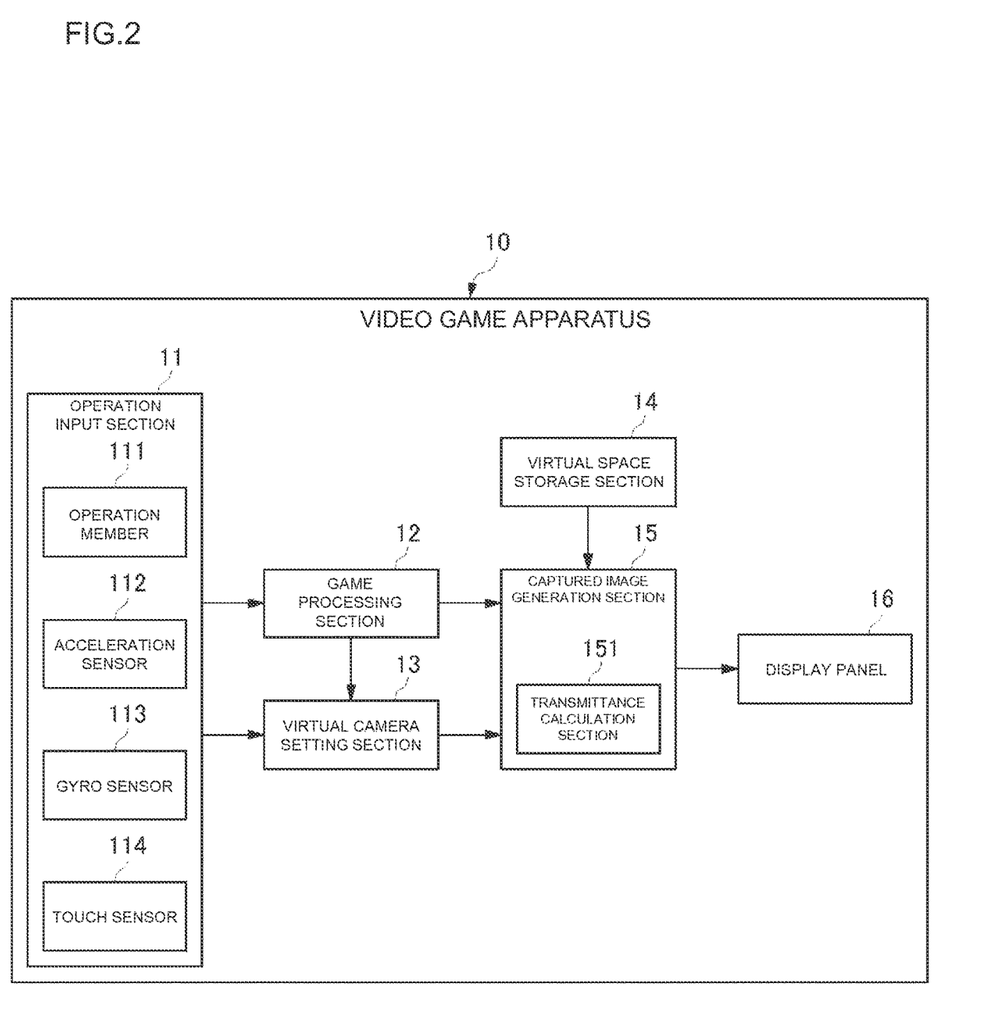
FIG. 2 shows an example non-limiting block diagram illustrating a configuration of a game apparatus.

FIG. 2 shows an example non-limiting block diagram illustrating a configuration of the video game apparatus 10. The video game apparatus 10 includes an operation input section 11, a game processing section 12, a virtual camera setting section 13, a virtual space storage section 14, a captured image generation section 15, and a display panel 16. The operation input section 11 may include an operation member 111, an acceleration sensor 112 serving as a motion detection sensor, a gyro sensor 113 serving as an orientation detection sensor, and a touch sensor 114. By including this operation input section 11, the video game apparatus 10 functions as an input device for inputting a user operation. The display panel 16 corresponds to the liquid crystal display panel included in the touch panel 30 in FIG. 1. The operation member 111 corresponds to the plurality of operation members 40 in FIG. 1. The touch sensor 114 corresponds to the touch sensor included in the touch panel 30 in FIG. 1.

The operation input section 11 inputs an operation performed by a user to the video game apparatus 10. As mentioned above, examples of the operation member 111 include the cross key 41, the stick 42, and the buttons 43 that are provided on the surface of the housing 20. The operation input section 11 detects physical operations performed by the user to these members. The acceleration sensor 112 detects acceleration (including gravity acceleration) produced on the video game apparatus 10. The gyro sensor 113 detects respective angular velocities around three orthogonal axes set in the video game apparatus 10. The touch sensor 114 detects an operation performed by the user to the surface of the touch panel 30 using a finger or a stylus in relation to images being displayed on the display panel 16.

The operation input section 11 detects an input user operation, and outputs a detection value of the detected user operation to the game processing section 12 and the virtual camera setting section 13. The game processing section 12, the virtual camera setting section 13, the virtual space storage section 14, and the captured image generation section 15 are implemented by an arithmetic processing device including a central processing unit (CPU) and a graphic processing unit (GPU) executing an information processing program of the present example embodiment. The information processing program of the present example embodiment is a game program. The information processing program is provided with being recorded on a non-transitory computer-readable storage medium. The game processing section 12 reads a game program from the storage medium and executes the game program, whereby the user can play a video game developed within the virtual space.

The acceleration detected by the acceleration sensor 112 changes according to orientation (an inclination angle) and movement of the video game apparatus 10 itself. Thus, the game processing section 12 and the virtual camera setting section 13 can calculate the orientation and the movement of the video game apparatus 10 using such acceleration data. In addition, the angular velocities detected by the gyro sensor 113 change according to orientation (an inclination angle) and movement of the video game apparatus 10 itself. Thus, the game processing section 12 and the virtual camera setting section 13 can calculate the orientation and the movement of the video game apparatus 10 using such angular velocity data.

The game processing section 12 progresses a video game in accordance with a game program, based on user an operation input obtained from the operation input section 11. This video game progresses by controlling a player character within a virtual space by the user. This video game may be any game such as a fighting game, an adventure game, and a puzzle game.

The virtual camera setting section 13 sets an imaging direction and a viewpoint position of the virtual camera virtually set in a virtual space. In addition, a zoom ratio (view angle) of this virtual camera may be adjustable. In such a case, the virtual camera setting section 13 further sets the zoom ratio of the virtual camera. The virtual camera setting section 13 automatically (regardless of a user operation) sets an imaging direction and a viewpoint position or virtual camera position in accordance with game processing of the game processing section 12. For example, when the game processing section 12 demonstrates a video game, the game processing section 12 provides the virtual camera setting section 13 with an instruction on a viewpoint position and an imaging direction of the virtual camera, in accordance with a demonstration program, regardless of a user operation, and the virtual camera setting section 13 sets a viewpoint position and an imaging direction of the virtual camera in accordance with this instruction.

In addition, the virtual camera setting section 13 sets an imaging direction and a viewpoint position in accordance with user operation input obtained from the operation input section 11. In particular, the virtual camera setting section 13 calculates orientation and movement of the video game apparatus 10 using the acceleration detected by the acceleration sensor 112 and the angular velocities detected by the gyro sensor 113, and changes an imaging direction and a viewpoint position of the virtual camera in accordance with the calculated orientation and the movement of the video game apparatus 10. Alternatively, the virtual camera setting section 13 may calculate orientation and movement of the video game apparatus 10 using only either one of the acceleration sensor 112 and the gyro sensor 113.

An imaging direction of the virtual camera may be changed only within a certain angle range, or may be changed without any limitation. An imaging direction may be limited according to a viewpoint position. A viewpoint position is limited in relation to a virtual space. In the present example embodiment, an imaging direction and a viewpoint position of the virtual camera can be set in such a manner that the virtual camera sees down from midair to a field set within a virtual space.

In the virtual space storage section 14, a three-dimensional (3D) model of a three-dimensional virtual space is stored. In the present example embodiment, a plurality of objects exists in a virtual space. A part of the plurality of objects has a transmittance variable according to an imaging direction of the virtual camera. In such an object (hereinafter, referred to as "transmittance variable object"), a relation between an imaging direction of the virtual camera and a transmittance is defined.

The captured image generation section 15 generates an image obtained by capturing an image of a virtual space with a virtual camera, and outputs image data to the display panel 16. The captured image is generated based on game development in the game processing section 12, a virtual camera setting in the virtual camera setting section 13, and a 3D model of a virtual space that is stored in the virtual space storage section 14.

The captured image generation section 15 includes a transmittance calculation section 151. When there is a transmittance variable object within a viewing field of a virtual camera, the transmittance calculation section 151 changes a transmittance of the transmittance variable object according to an imaging direction of the virtual camera, in accordance with a relation between an imaging direction of the virtual camera and a transmittance that is stored in the virtual space storage section 14. The transmittance of a transmittance variable object may be set to be variable within 0% to 100%. When the transmittance is 0%, the transmittance variable object is displayed in a similar manner to other objects, without being made transparent. When the transmittance is 100%, any transmittance variable object is not displayed at all. Alternatively, the transmittance of a transmittance variable object may be set to be variable within an arbitrary range (for example, 0-80%) within 0-100%.

Figure 3:
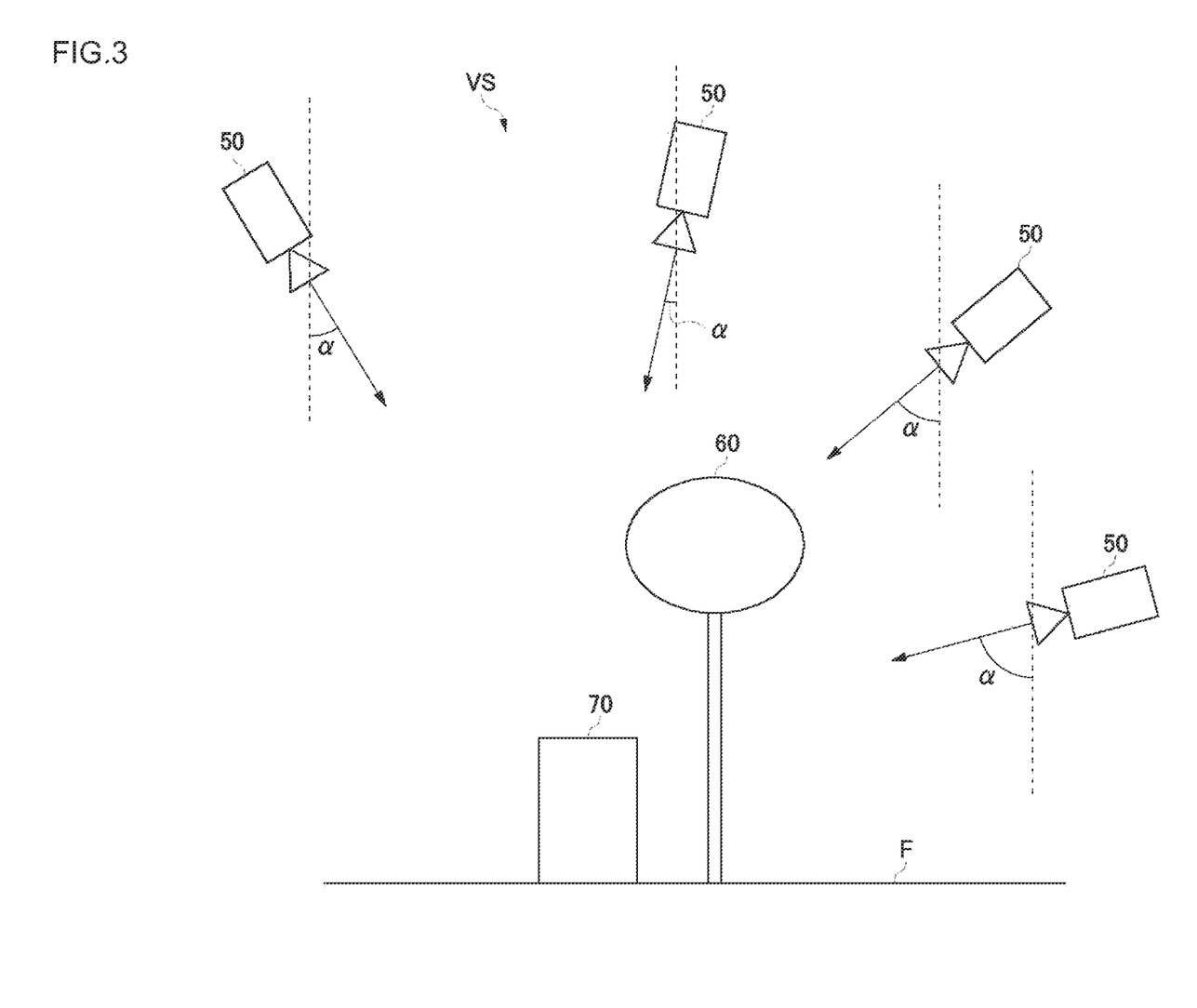
FIG. 3 shows an example non-limiting diagram for illustrating an imaging direction of a virtual camera set in a virtual space.

FIG. 3 shows an example non-limiting diagram for illustrating an imaging direction of a virtual camera set in a virtual space. As shown in FIG. 3, a viewpoint position and an imaging direction of a virtual camera 50 are variable in a virtual space VS. An imaging direction of the virtual camera 50 is defined as an angle with respect to a direction in which the virtual camera 50 sees down to a field F of the virtual space VS. More specifically, an imaging direction of the virtual camera 50 is defined as an angle α with respect to a normal line of the field F that is defined in the virtual space VS. The normal direction of the field F is namely a gravity direction in the virtual space VS.

In the example shown in FIG. 3, in the virtual space VS, there are objects 60 and 70 as building structure objects on the field F. Among these objects, the object 60 located in midair above the field F is set as a transmittance variable object. This transmittance variable object 60 is an object that does not affect a game developed within the virtual space VS. That is, the transmittance variable object 60 is an object that does not affect the game progress even if the transmittance of this transmittance variable object 60 changes (even if the transmittance becomes 100%). In other words, the transmittance variable object 60 is an object not used in the game. For example, the transmittance variable object 60 is an object located outside a movable range of a player object within the virtual space VS.

Figure 4:
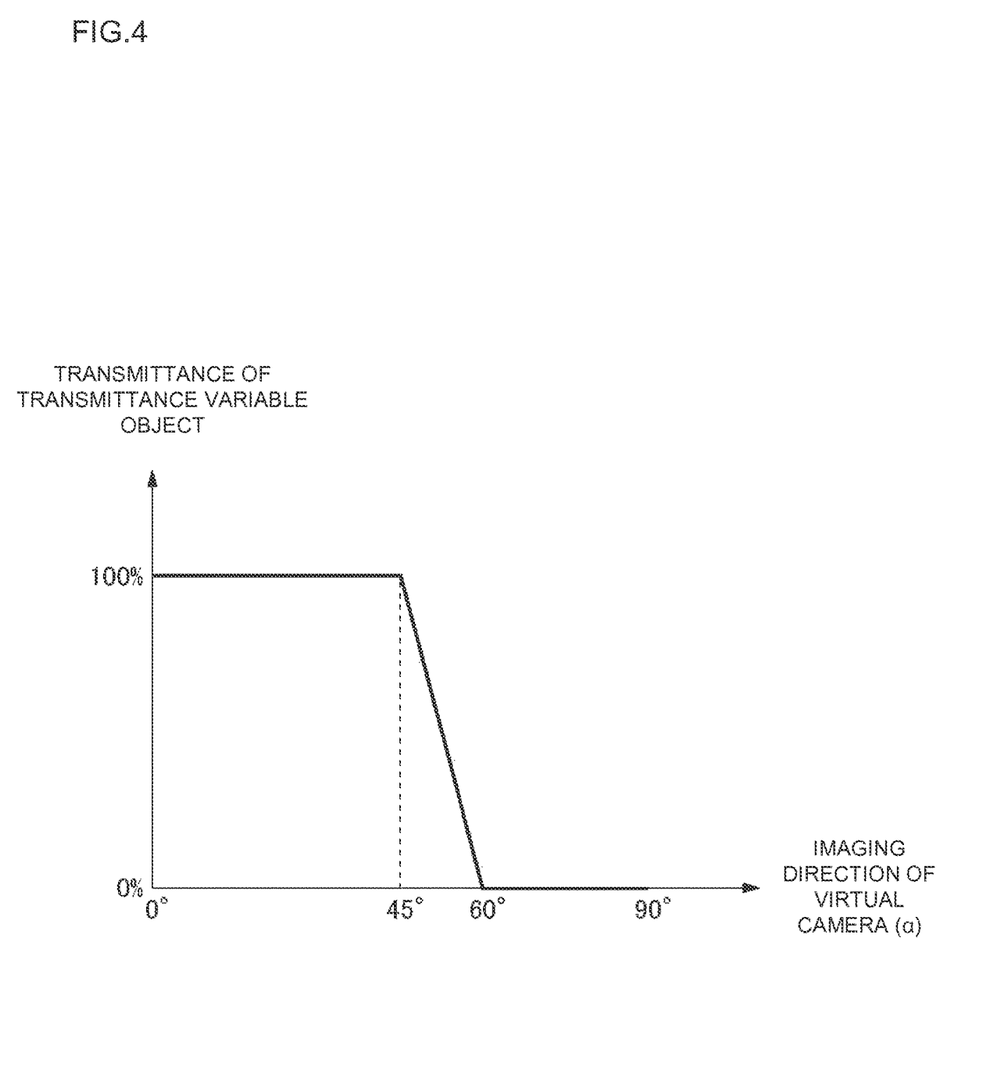
FIG. 4 shows an example non-limiting graph indicating a relation between an imaging direction of a virtual camera and a transmittance of a transmittance variable object.

FIG. 4 shows an example non-limiting graph indicating a relation between an imaging direction of a virtual camera and a transmittance of a transmittance variable object. As shown in FIG. 4, when an imaging direction is 0° to 45°, a transmittance is set at the maximum 100%. When an imaging direction is 45° to 60°, a transmittance is set to be in a change range in which a transmittance linearly decreases according to the increase of an imaging direction. When an imaging direction is 60° to 90°, a transmittance is set at the minimum 0%. In other words, in the example shown in FIG. 4, the lower limit of the change range is 45°, and the upper limit thereof is 60°. In the example shown in FIG. 4, a transmittance of a transmittance variable object linearly changes in proportion to an imaging direction of the virtual camera in this change range. Alternatively, the transmittance may nonlinearly change. In addition, the upper limit and the lower limit of the change range are not limited to the above-described examples, and may be arbitrarily set within 0°-90°. The upper limit may be 90° or larger. In addition, the entire variable range of an imaging direction of the virtual camera may be set as a change range of a transmittance of a transmittance variable object.

The transmittance of a transmittance variable object may change based not only on an imaging direction of the virtual camera but also on elements other than the imaging direction. For example, the transmittance of a transmittance variable object may change based on a viewpoint position of the virtual camera. More specifically, the transmittance of a transmittance variable object may change based on a distance between the virtual camera and the transmittance variable object, and the transmittance of a transmittance variable object may change based on a distance between the virtual camera and a player object. Furthermore, the transmittance of a transmittance variable object may change according to the state of a game or the state of a player object. In these cases, the captured image generation section 15 may generate a captured image in accordance with the maximum transmittance among a transmittance based on an imaging direction of the virtual camera and transmittances based on other elements. In addition, the captured image generation section 15 may generate a captured image in accordance with the minimum transmittance among a transmittance based on an imaging direction of the virtual camera and transmittances based on other elements. In addition, the captured image generation section 15 may generate a captured image in accordance with the average value of a transmittance based on an imaging direction of the virtual camera and transmittances based on other elements.

In addition, the transmittance of a transmittance variable object may change based on an imaging direction of the virtual camera, regardless of a viewpoint position of the virtual camera. In addition, the transmittance of a transmittance variable object may change based on an imaging direction of the virtual camera, regardless of a viewpoint position of the virtual camera, the state of a game, and the state of a player object. Furthermore, the transmittance of a transmittance variable object may change only based on an imaging direction of the virtual camera, regardless of other elements.

In addition, if a plurality of transmittance variable objects is set in a virtual space, a relation between an imaging direction of the virtual camera and the transmittance of a transmittance variable object as shown in FIG. 4 may be defined for each transmittance variable object. Furthermore, for one transmittance variable object, a relation between an imaging direction of the virtual camera and the transmittance of a transmittance variable object may be defined for each viewpoint position of the virtual camera. In addition, the transmittance may be variable according to a viewpoint position of the virtual camera, or the transmittance may remain constant (not change), for example, at 0%, regardless of an imaging direction.

The display panel 16 displays a captured image generated by the captured image generation section 15. Through this captured image, the user can see an object located behind a transmittance variable object viewed from a virtual camera.

In the above-described example embodiment, the description has been given of an example in which the information processing system is constituted by the video game apparatus 10 alone. Nevertheless, the configuration of the information processing system may be as follows. The game processing section 12, the virtual camera setting section 13, the virtual space storage section 14, and the captured image generation section 15 may be included in a video game apparatus main body. The operation input section 11 and the display panel 16 may be included in a display panel-incorporated input device. The information processing system may be constituted by this video game apparatus main body and the display panel-incorporated input device. In such a case, user operation input detected by the operation input section 11 may be sent to the video game apparatus main body from the display panel-incorporated input device, a captured image generated by the captured image generation section 15 of the video game apparatus main body may be sent to the display panel-incorporated input device, and the display panel 16 of the display panel-incorporated input device may display the captured image.

In addition, the game processing section 12, the virtual camera setting section 13, the virtual space storage section 14, and the captured image generation section 15 may be included in a video game apparatus main body. The operation input section 11 may be included in an input device provided separately from the video game apparatus main body. The display panel 16 may be included a display device provided separately from the video game apparatus main body and the input device. The information processing system may be constituted by this video game apparatus main body, the input device, and the display device. In such a case, user operation input detected by the operation input section 11 may be sent to the video game apparatus main body from the input device, a captured image generated by the captured image generation section 15 of the video game apparatus main body may be sent to the display device, and the display panel 16 of the display device may display the captured image.

In the above-described example embodiment, the description has been given of an example in which the information processing system is configured in the video game apparatus for executing a video game developed in a three-dimensional virtual space. Nevertheless, the technology is not limited to this. The information processing for viewing a captured image of a virtual space by controlling a virtual camera may not include a game element. For example, the information processing system of the technology may be applied to a system for displaying an image captured from an arbitrary direction in a virtual space for city planning simulation or flight simulation.

What is claimed is:

1. An information processing system for generating a captured image of a virtual camera set in a virtual space, the information processing system comprising one or more computer processors configured to perform:
    virtual camera setting to set an imaging direction of the virtual camera; and
    image generation to change a transparency of a predetermined object within the virtual space based on an imaging direction of the virtual camera, and generate a captured image of the virtual camera, wherein
    said predetermined object is an object locally existing in the virtual space; and
    the image generation sets the transparency at a maximum when an angle between a predetermined direction in the virtual space and an imaging direction of the virtual camera is smaller than a lower limit of a predetermined change range in which the transparency changes as the angle changes.
2. The information processing system according to claim 1, wherein
    the virtual camera setting sets an imaging direction of the virtual camera based on an operation performed by a user to an input device.
3. The information processing system according to claim 2, wherein
    the virtual camera setting sets an imaging direction of the virtual camera based on one or more detection values of an orientation detection sensor and/or a motion detection sensor that are included in the input device.
4. The information processing system according to claim 2, wherein
    the input device further includes a display device configured to display the generated captured image.
5. The information processing system according to claim 2, wherein
    the information processing system is included in the input device.
6. The information processing system according to claim 1, wherein
    the image generation changes a transparency of the predetermined object based on a relation between the predetermined direction in the virtual space and the imaging direction of the virtual camera.

7. The information processing system according to claim 6, wherein
    the image generation changes the transparency based on the angle between the predetermined direction in the virtual space and the imaging direction of the virtual camera.
8. The information processing system according to claim 7, wherein
    the image generation linearly changes the transparency based on the angle when the angle is within the predetermined change range.
9. The information processing system according to claim 8, wherein
    the image generation linearly changes the transparency from a maximum to a minimum according to the angle, when the angle changes from a lower limit to an upper limit of the predetermined change range.
10. The information processing system according to claim 7, wherein
    the image generation sets the transparency to be higher as the angle is smaller.
11. The information processing system according to claim 5, wherein
    the predetermined direction is a direction in which the virtual camera sees down to the virtual space.
12. The information processing system according to claim 11, wherein
    the predetermined direction is a gravity direction of the virtual space.
13. The information processing system according to claim 11, wherein
    the predetermined direction is a normal direction of a field of the virtual space.
14. The information processing system according to claim 1, wherein
    the predetermined object is one of the objects within the virtual space.
15. The information processing system according to claim 14, wherein
    the predetermined object is a midair object within the virtual space.
16. The information processing system according to claim 14, wherein
    the predetermined object is an object having no influence on a video game developed within the virtual space.
17. The information processing system according to claim 1, wherein
    a plurality of the predetermined objects is set in the virtual space, and wherein a relation between an imaging direction of the virtual camera and the transparency is set for each of the predetermined objects.
18. The information processing system according to claim 1, wherein
    the image generation changes the transparency based on a position of the virtual camera within the virtual space.
19. The information processing system according to claim 18, wherein
    the image generation changes the transparency based on a distance between the virtual camera and a player object within the virtual space.
20. A device configured to display a captured image of a virtual camera set in a virtual space, the device comprising:
    a sensor configured to detect orientation and/or motion;
    one or more computer processors configured to perform:
    image generation to change a transparency of a predetermined object within the virtual space based on one or more detection values of the sensor, and generate a captured image of the virtual camera; and a display device configured to display the captured image, wherein said predetermined object is an object locally existing in the virtual space; and the image generation sets the transparency at a maximum when an angle between a predetermined direction in the virtual space and an imaging direction of the virtual camera is smaller than a lower limit of a predetermined change range in which the transparency changes as the angle changes.

21. An information processing method for generating a captured image of a virtual camera set in a virtual space, the information processing method comprising:

setting an imaging direction of the virtual camera; and changing a transparency of a predetermined object within the virtual space based on an imaging direction of the virtual camera, and generating a captured image of the virtual camera, wherein said predetermined object is an object locally existing in the virtual space; and the generating of the captured image includes setting the transparency at a maximum when an angle between a predetermined direction in the virtual space and an imaging direction of the virtual camera is smaller than a lower limit of a predetermined change range in which the transparency changes as the angle changes.

22. A non-transitory computer-readable storage medium comprising an information processing program for generating a captured image of a virtual camera set in a virtual space, the information processing program causing a computer to:

set an imaging direction of the virtual camera; and change a transparency of a predetermined object within the virtual space based on an imaging direction of the virtual camera, and generate a captured image of the virtual camera, wherein said predetermined object is an object locally existing in the virtual space; and generation of the captured image includes setting the transparency at a maximum when an angle between a predetermined direction in the virtual space and an imaging direction of the virtual camera is smaller than a lower limit of a predetermined change range in which the transparency changes as the angle changes.

23. An information processing system for generating a captured image of a virtual camera set in a virtual space, the information processing system comprising one or more computer processors configured to perform:

virtual camera setting to set an imaging direction of the virtual camera; and image generation to change a transparency of a predetermined object within the virtual space based on an imaging direction of the virtual camera, and generate a captured image of the virtual camera, wherein said predetermined object is an object locally existing in the virtual space; and the image generation sets the transparency at a minimum when an angle between a predetermined direction in the virtual space and an imaging direction of the virtual camera is larger than an upper limit of a predetermined change range in which the transparency changes as the angle changes.

24. A device configured to display a captured image of a virtual camera set in a virtual space, the device comprising:

a sensor configured to detect orientation and/or motion;

one or more computer processors configured to perform:

image generation to change a transparency of a predetermined object within the virtual space based on one or more detection values of the sensor, and generate a captured image of the virtual camera; and a display device configured to display the captured image, wherein said predetermined object is an object locally existing in the virtual space; and the image generation sets the transparency at a minimum when an angle between a predetermined direction in the virtual space and an imaging direction of the virtual camera is larger than an upper limit of a predetermined change range in which the transparency changes as the angle changes.

25. An information processing method for generating a captured image of a virtual camera set in a virtual space, the information processing method comprising:

setting an imaging direction of the virtual camera; and changing a transparency of a predetermined object within the virtual space based on an imaging direction of the virtual camera, and generating a captured image of the virtual camera, wherein said predetermined object is an object locally existing in the virtual space; and the generating of the captured image includes setting the transparency at a minimum when an angle between a predetermined direction in the virtual space and an imaging direction of virtual camera is larger than an upper limit of a predetermined change range in which the transparency changes as the angle changes.

26. A non-transitory computer-readable storage medium comprising an information processing program for generating a captured image of a virtual camera set in a virtual space, the information processing program causing a computer to:

set an imaging direction of the virtual camera; and change a transparency of a predetermined object within the virtual space based on an imaging direction of the virtual camera, and generate a captured image of the virtual camera, wherein said predetermined object is an object locally existing in the virtual space and; and generation of the captured image includes setting the transparency at a minimum when an angle between a predetermined direction in the virtual space and an imaging direction of the virtual camera is larger than an upper limit of a predetermined change range in which the transparency changes as the angle changes.

27. The system of claim 1, wherein the transparency changes non-linearly as the angle changes in the predetermined change range.

28. The device of claim 20, wherein the transparency changes linearly as the angle changes in the predetermined change range.

29. The method of claim 21, wherein the transparency changes linearly as the angle changes in the predetermined change range.

30. The system of claim 23, wherein the transparency changes linearly as the angle changes in the predetermined change range.

31. The device of claim 24, wherein the transparency changes linearly as the angle changes in the predetermined change range.

32. The method of claim 25, wherein the transparency changes linearly as the angle changes in the predetermined change range.

33. The system of claim 1, wherein the transparency is maintained at the set maximum once the angle is smaller than the lower limit of the predetermined change range and as the angle becomes even smaller.

34. The device of claim 20, wherein the transparency is maintained at the set maximum once the angle is smaller than the lower limit of the predetermined change range and as the angle becomes even smaller.

35. The method of claim 21, wherein the transparency is maintained at the set maximum once the angle is smaller than the lower limit of the predetermined change range and as the angle becomes even smaller.

36. The non-transitory computer-readable storage medium of claim 22 wherein the transparency is maintained at the set maximum once the angle is smaller than the lower limit of the predetermined change range and as the angle becomes even smaller.

37. The system of claim 23, wherein the transparency is maintained at the set minimum once the angle is larger than the upper limit of the predetermined change range and as the angle becomes even larger.

38. The device of claim 24, wherein the transparency is maintained at the set minimum once the angle is larger than the upper limit of the predetermined change range and as the angle becomes even larger.

39. The method of claim 25, wherein the transparency is maintained at the set minimum once the angle is larger than the upper limit of the predetermined change range and as the angle becomes even larger.

40. The non-transitory computer-readable storage medium of claim 26, wherein the transparency is maintained at the set minimum once the angle is larger than the upper limit of the predetermined change range and as the angle becomes even larger.

41. The system of claim 1, wherein the transparency is set at a value of 100% as the maximum when the angle between the predetermined direction in the virtual space and the imaging direction of the virtual camera is smaller than the lower limit of the predetermined change range.

42. The device of claim 20, wherein the transparency is set at a value of 100% as the maximum when the angle between the predetermined direction in the virtual space and the imaging direction of the virtual camera is smaller than the lower limit of the predetermined change range.

43. The method of claim 21, wherein the transparency is set at a value of 100% as the maximum when the angle between the predetermined direction in the virtual space and the imaging direction of the virtual camera is smaller than the lower limit of the predetermined change range.

44. The non-transitory computer-readable storage medium of claim 22 wherein the transparency is set at a value of 100% as the maximum when the angle between the predetermined direction in the virtual space and the imaging direction of the virtual camera is smaller than the lower limit of the predetermined change range.

45. The system of claim 23, wherein the transparency is set at a value of 0% as the minimum when the angle between the predetermined direction in the virtual space and the imaging direction of the virtual camera is larger than the upper limit of the predetermined change range.

46. The device of claim 24, wherein the transparency is set at a value of 0% as the minimum when the angle between the predetermined direction in the virtual space and the imaging direction of the virtual camera is larger than the upper limit of the predetermined change range.

47. The method of claim 25, wherein the transparency is set at a value of 0% as the minimum when the angle between the predetermined direction in the virtual space and the imaging direction of the virtual camera is larger than the upper limit of the predetermined change range.

48. The non-transitory computer-readable storage medium of claim 26, wherein the transparency is set at a value of 0% as the minimum when the angle between the predetermined direction in the virtual space and the imaging direction of the virtual camera is larger than the upper limit of the predetermined change range.

* * * * *